United States Patent [19]

Bailey et al.

[11] 4,254,022

[45] Mar. 3, 1981

[54] PROTEIN CONCENTRATE FROM HIGH-PROTEIN PEARL MILLET

[75] Inventors: August V. Bailey; Gene Sumrell, both of New Orleans, La.

[73] Assignee: The United States of America as represented by the Secretary of Agriculture, Washington, D.C.

[21] Appl. No.: 132,582

[22] Filed: Mar. 21, 1980

[51] Int. Cl.³ .................................................. A23J 1/12
[52] U.S. Cl. ......................... 260/112 R; 260/112 G; 260/123.5; 426/416; 426/429; 426/436
[58] Field of Search ............. 260/112 R, 112 G, 123.5

[56] References Cited

PUBLICATIONS

Crop Science, vol. 12, 1972, pp. 187–188, Burton et al.

*Primary Examiner*—Howard E. Schain
*Attorney, Agent, or Firm*—M. Howard Silverstein; Raymond C. Von Bodungen; David G. McConnell

[57] ABSTRACT

Procedures are described for obtaining about 80% of the high-grade protein in pearl millet grain as a concentrate. These procedures involve extraction of lipid-free whole millet flour with a combination of 70% aqueous isopropyl alcohol, aqueoussodium hydroxide, and dilute mineral acid to give three protein-rich fractions, which can be combined for optimum use as a protein concentrate.

4 Claims, 2 Drawing Figures

4,254,022

PROTEIN CONCENTRATE FROM HIGH-PROTEIN PEARL MILLET

BACKGROUND OF THE INVENTION (1) Field of the Invention

This invention relates to the separation of a high-grade plant protein concentrate from pearl millet grain.

(2) Description of the Prior Art

It is well known that grains and other seed materials contain valuable protein plus other components such as starch and oil. For certain purposes it is desirable to treat these materials to obtain compositions which contain an increased proportion of protein. These high-protein concentrates can be used to fortify foods and beverages in order to increase their nutritional value. Pearl millet has been shown to be more nutritious than other cereal grains, and to contain more protein and a better quality of protein than other cereals (G. W. Burton et al., Crop Science 12: 187–188 (1972)). Methods have been developed for the preparation of protein concentrate from some of the cereals, such as wheat (Y. V. Wu and K. R. Sexson, J. Agric. Food Chem. 23: 903–905 (1975)), sorghum (Y. V. Wu, J. Agric. Food Chem. 26: 305–309 (1978)), and rice (M. A. Conner et al., Cereal Chem. 53: 488–496 (1976)). Differing physical properties of the proteins in different plants prevent the successful application of a separation procedure applicable to the preparation of a protein concentrate of one cereal grain to another. No process has been available for the preparation of a high-protein concentrate from pearl millet grain.

SUMMARY OF THE INVENTION

This invention relates to a process for the preparation of a high-protein concentrate of the nutritious protein present in pearl millet grain. The process consists of successive extractions of defatted pearl millet flour with three solvent combinations in either of two sequences, which are: (1) about 50–90% lower ($C_1$–$C_4$) aqueous alcohol, followed by aqueous sodium hydroxide (pH 8–12), and then dilute aqueous mineral acid (pH 1–3); or (2) aqueous sodium hydroxide (pH 8–12), followed by 50–90% aqueous lower alcohol ($C_1$–$C_4$), and then dilute aqueous mineral acid (pH 1–3). Either procedure removes over 80% of the protein present in the flour.

DESCRIPTION OF THE PREFERRED EMBODIMENTS

Figure 1:
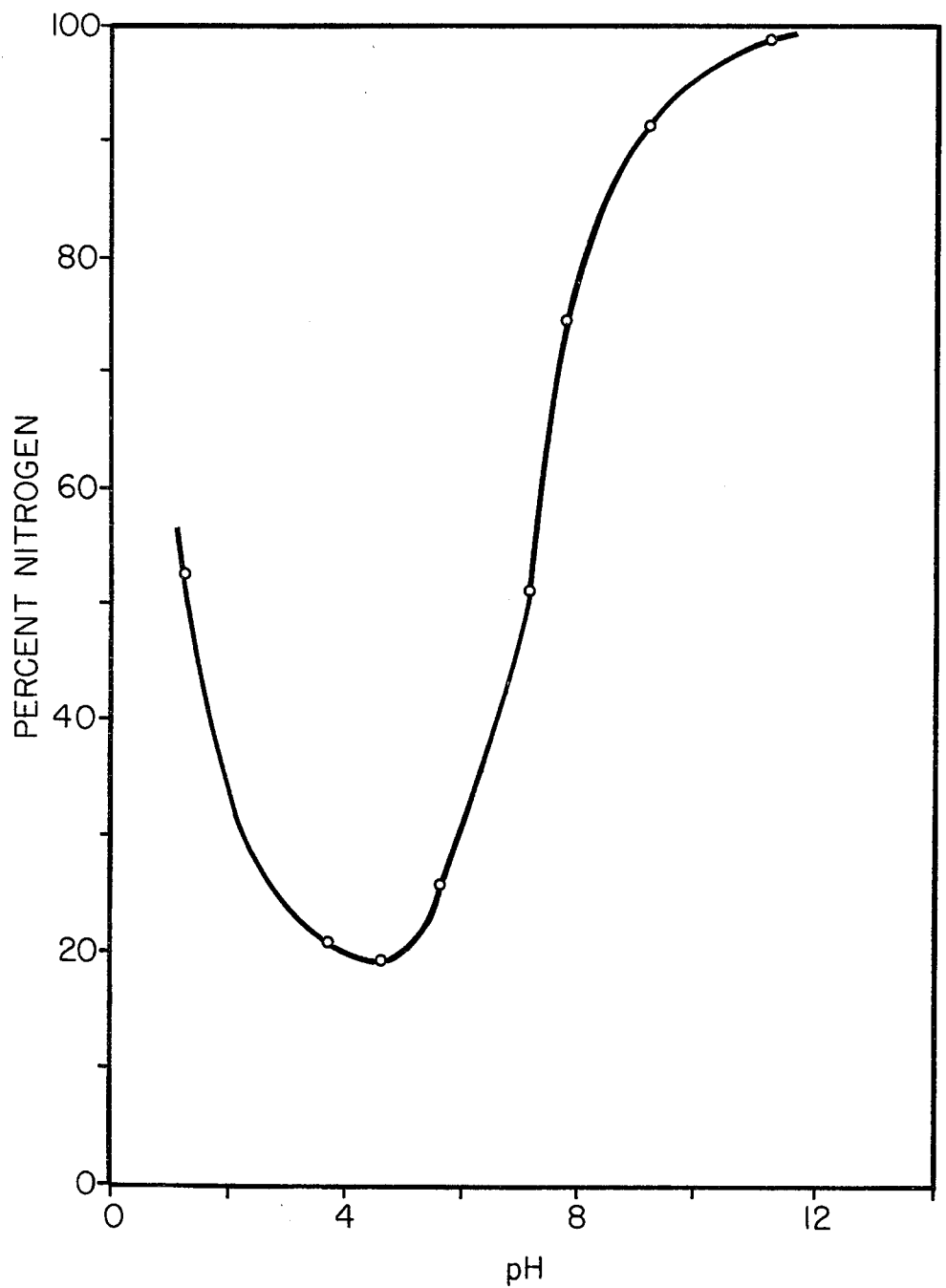
Figure 2:
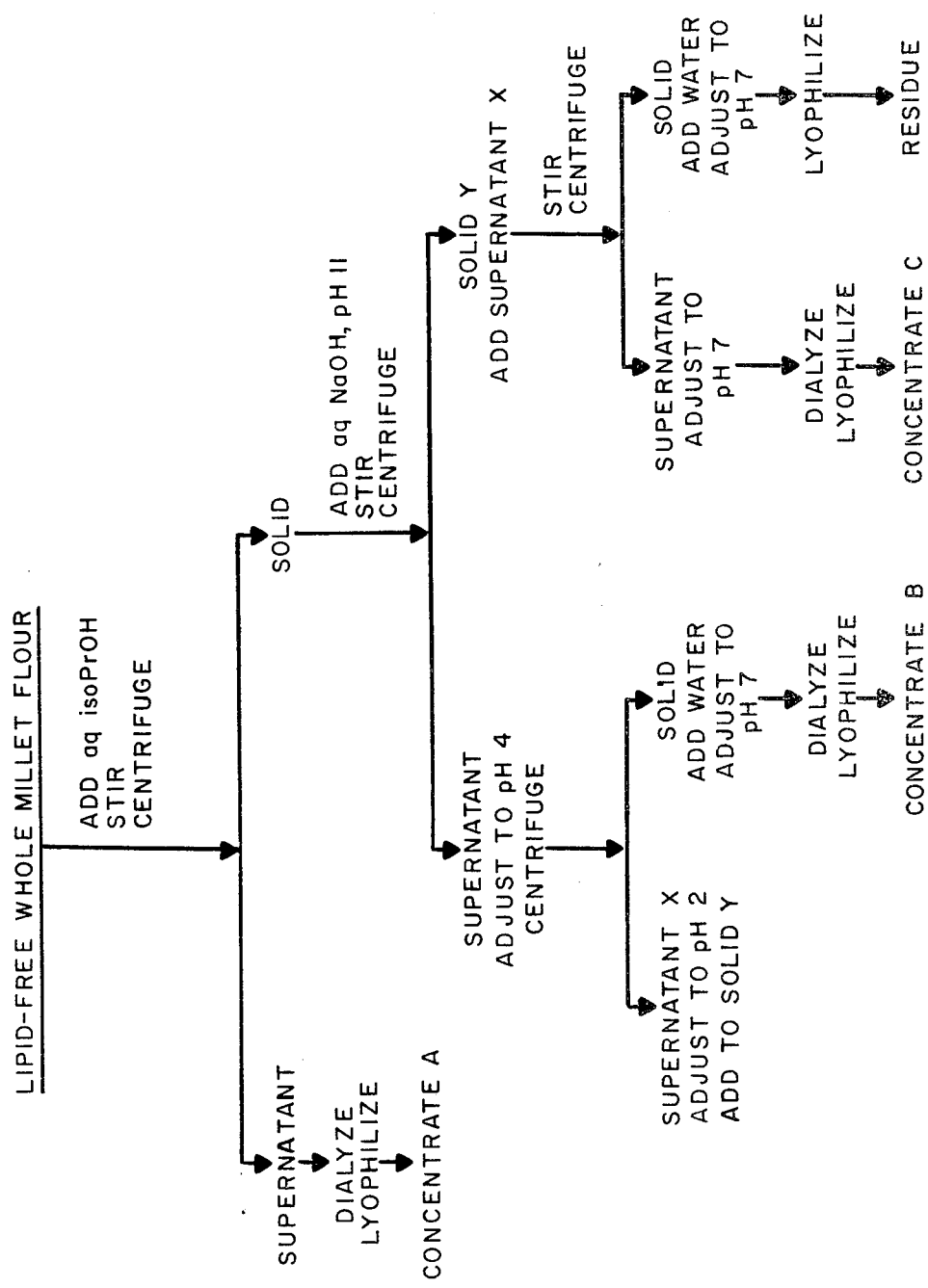

The solubility of the protein components of pearl millet as a function of pH is presented in FIG. 1, showing a minimum solubility at pH 4.5. However, all of the pearl millet protein does not precipitate at this point, and an involved procedure is necessary to obtain the major part of it as a concentrate. The process for the separation of a major portion of the protein contained in the pearl millet grain is presented in a schematic diagram in FIG. 2. The process consists of the use of a combination of three solvent mixtures to separate over 80% of the protein present in pearl millet flour. FIG. 2 shows the sequence: Extraction with aqueous isopropyl alcohol, followed by aqueous alkali, and finally dilute aqueous mineral acid. An alternate procedure giving similar results involves a reversal of the first and second steps, i.e., extraction first with aqueous alkali, followed by extraction with aqueous isopropyl alcohol. The final step in both procedures is extraction with dilute aqueous mineral acid of pH 1–3, preferably about pH 2. The alkali extraction medium may range from pH 8–12, but is preferably about pH 11. Any of the lower alcohols ($C_1$–$C_4$) are suitable for the aqueous alcohol extraction, with the alcohol content in the 50 to 90% range. Best results are obtained at about 70% alcohol, and isopropyl alcohol combines efficiency of the process and economics of the process.

The three fractions of concentrate, varying in protein content, may be combined to give a concentrate containing approximately 60% protein. A concentrate of higher protein content can be prepared by eliminating the fraction separated in the third step with aqueous acid, and combining the other two fractions, giving a concentrate which is over 75% protein, and which contains more than 70% of the protein originally present in the pearl millet flour.

Specific details of the process are given in Examples 1 and 2. Data from these two experiments are tabulated in Table I. Protein analyses were determined by the macro-Kjeldahl method, using % N×6.25 as conversion factor.

EXAMPLE 1

Clean pearl millet grain free of glumes and broken kernels was homogenized in petroleum ether using a tissue homogenizer. (Any mechanical grinder or blender will work) The mixture was centrifuged, and the lipids removed by decanting off the supernatant. The flour was air dried and ground with a mortar and pestle until all would pass through a 60 mesh screen. Twenty grams of this flour containing 20.9% protein was extracted about 6–12 hours with 200 ml of aqueous 70% isopropyl alcohol. The flour was recovered by centrifugation and washed two times with 200-ml volumes of 70% aqueous isopropyl alcohol. The combined extracts were dialyzed 12–18 hours against deionized water at ambient temperature, and lyophilized to give 2.39 of a white powder, Concentrate A, which analyzed for 13.02% N, or 81.4% protein.

The recovered flour was then extracted three times for 30 minutes each time with 200-ml volumes of aqueous sodium hydroxide, (pH 11). At the end of each extraction, the supernatant was adjusted to pH 4 with conc hydrochloric acid, and the precipitated proteins were recovered by centrifugation. These three fractions of solid were suspended in a neutral solution (pH 7), dialyzed overnight against deionized water at ambient temperature, and lyophilized to give 1.37 g of an off-white powder, Concentrate B, which analyzed for 11.30% N, or 70.6% protein.

The combined supernatant from Concentrate B was adjusted to pH 2 with conc hydrochloric acid. This solution was divided into three equal volumes and used to extract the recovered flour three additional times. The supernatants were recovered by decanting after centrifugation. The combined supernatants were neutralized (pH 7) with dilute sodium hydroxide, dialyzed 12–18 hours against deionized water at ambient temperature, and lyophilized to give 1.83 g of a tan-colored, grainy material, Concentrate C, which analyzed for 3.17% N, or 19.8% protein.

EXAMPLE 2

Twenty grams of defatted whole pearl millet flour, obtained as described in Example 1, was treated to the same series of extractions except that aqueous sodium hydroxide, (pH 11), was used as the first extraction medium, and 70% aqueous isopropyl alcohol was used as the second extraction medium. When this sequence was followed, Concentrate A (obtained from the aqueous alcohol extraction) amounted to 1.98 g of material analyzing for 13.79% N, or 86.2% protein. Concentrate B (obtained from the aqueous alkali extraction) amounted to 1.70 g of material analyzing for 10.77% N, or 67.3% protein. Concentrate C (obtained from the aqueous acid extraction) amounted to 1.81 g of material analyzing for 3.20% N, or 20.0% protein.

TABLE I.

Yields in Fractions of Pearl Millet Protein Concentrates[a]

| Material | Fraction wt (g) | % of flour | Protein content (%) | % of original protein |
|---|---|---|---|---|
| 70% aq IsoPrOH extract | 2.39 | 11.9 | 81.4 | 48.5 |
| Aq NaOH extract, pH 11 to pH 4 | 1.37 | 6.8 | 70.6 | 24.2 |
| Mineral acid extract, pH 4 to pH 2 | 1.83 | 9.2 | 19.8 | 9.1 |
| TOTAL CONCENTRATE | 5.59 | 27.9 | 59.4 | 81.8 |
| Residual flour | 10.53 | 52.6 | 4.0 | 10.5 |
| Aq NaOH extract, pH 11 to pH 4 | 1.70 | 8.5 | 67.3 | 28.5 |
| 70% aq IsoPrOH | 1.98 | 9.9 | 86.2 | 42.8 |
| Mineral acid extract, pH 4 to pH 2 | 1.81 | 9.1 | 20.0 | 9.0 |
| TOTAL CONCENTRATE | 5.49 | 27.5 | 58.7 | 80.3 |
| Residual flour | 9.00 | 45.0 | 4.9 | 11.0 |

[a]First 5 lines of data apply to procedure using aqueous isopropyl alcohol as the initial extractant; last 5 lines of data apply to alternate procedure using aqueous NaOH as the initial extractant.

We claim:

1. A process for obtaining a high-protein concentrate of the protein present in pearl millet grain by extraction of the defatted flour in sequence with aqueous lower ($C_1$–$C_4$) alcohol (50–90%); aqueous alkali (pH 8–12); dilute aqueous mineral acid (pH 1–3); and, recovery of the protein concentrate from the extracts.

2. A process for obtaining a high-protein concentrate of the protein present in pearl millet grain by extraction of the defatted flour in sequence with aqueous alkali (pH 8–12); aqueous lower alcohol ($C_1$–$C_4$); and then dilute aqueous mineral acid (pH 1–3).

3. The process of claims 1 or 2 in which the alcohol is isopropyl alcohol, the alkali is sodium hydroxide, and the mineral acid is hydrochloric acid.

4. The process of claims 1 or 2 in which the alcohol concentration is 60–80%, the pH of the aqueous alkali is about 11, and the pH of the aqueous acid is about 2.

* * * * *